(12) United States Patent
Barsali

(10) Patent No.: US 10,124,905 B2
(45) Date of Patent: Nov. 13, 2018

(54) SUSPENSION SYSTEM FOR AN AIRCRAFT AUXILIARY POWER UNIT

(71) Applicant: Airbus Operations S.L., Madrid (ES)

(72) Inventor: Guilherme Barsali, Madrid (ES)

( * ) Notice: Subject to any disclaimer, the term of this patent is extended or adjusted under 35 U.S.C. 154(b) by 0 days.

(21) Appl. No.: 15/540,777

(22) PCT Filed: Dec. 18, 2015

(86) PCT No.: PCT/ES2015/070927
§ 371 (c)(1),
(2) Date: Jun. 29, 2017

(87) PCT Pub. No.: WO2016/107943
PCT Pub. Date: Jul. 7, 2016

(65) Prior Publication Data
US 2018/0022468 A1 Jan. 25, 2018

(30) Foreign Application Priority Data

Dec. 30, 2014 (EP) ..................................... 14382585

(51) Int. Cl.
| | | |
|---|---|---|
| *B64D 41/00* | (2006.01) | |
| *F16B 5/02* | (2006.01) | |
| *F16F 15/08* | (2006.01) | |
| *B60K 5/12* | (2006.01) | |
| *B64D 27/26* | (2006.01) | |

(52) U.S. Cl.
CPC ............ *B64D 41/00* (2013.01); *F16B 5/0283* (2013.01); *F16F 15/08* (2013.01); *B60K 5/1241* (2013.01); *B64D 27/26* (2013.01); *B64D 2041/002* (2013.01)

(58) Field of Classification Search
CPC ........ B60K 5/12; B60K 5/1241; B64D 27/26; B64D 2041/002; B64D 41/00; F16B 5/0283; F16F 15/08
USPC ................. 248/554, 556; 267/141.1, 140.11; 244/54, 58; 403/350, 367
See application file for complete search history.

(56) References Cited

U.S. PATENT DOCUMENTS 2,175,825 A * 10/1939 Browne ................. B64D 27/04
248/556
4,437,628 A * 3/1984 Schwartz ............... B64D 25/06
244/122 AE
(Continued)

OTHER PUBLICATIONS

International Search Report for PCT/ES2015/070927, dated Apr. 22, 2016, 4 pages.

*Primary Examiner* — Tan Le
(74) *Attorney, Agent, or Firm* — Nixon & Vanderhye P.C.

(57) ABSTRACT

A suspension system for an aircraft auxiliary power unit located in a fuselage structure, the system including: struts (10), auxiliary power unit attachment brackets (51,52) for connecting the strut (10) to the auxiliary power unit (30), vibration isolators (5) for joining the struts (10) and the auxiliary power unit attachment bracket (51, 52), a cone-bolt (1) attached to the auxiliary power unit attachment brackets (51,52) and having a longitudinal threaded hollow, an inner bolt (2) partially located within the hollow of the cone-bolt (1) and threaded to it (1), an outer bolt (3) having a longitudinal through-hole and partially located within the hollow of the cone-bolt (1) and including an external thread that engages the thread of the cone-bolt (1), the inner bolt (2) extending across the hollow of said outer bolt (3).

17 Claims, 3 Drawing Sheets

(56) References Cited

U.S. PATENT DOCUMENTS

| | | | | |
|---|---|---|---|---|
| 5,558,457 A | * | 9/1996 | Mullenberg | F16B 3/06 403/367 |
| 6,328,293 B1 | * | 12/2001 | Olsen | B60K 5/1241 244/54 |
| 2010/0226715 A1 | * | 9/2010 | Schneider | F16B 3/06 403/350 |
| 2018/0022468 A1 | * | 1/2018 | Barsali | B64D 41/00 |

* cited by examiner

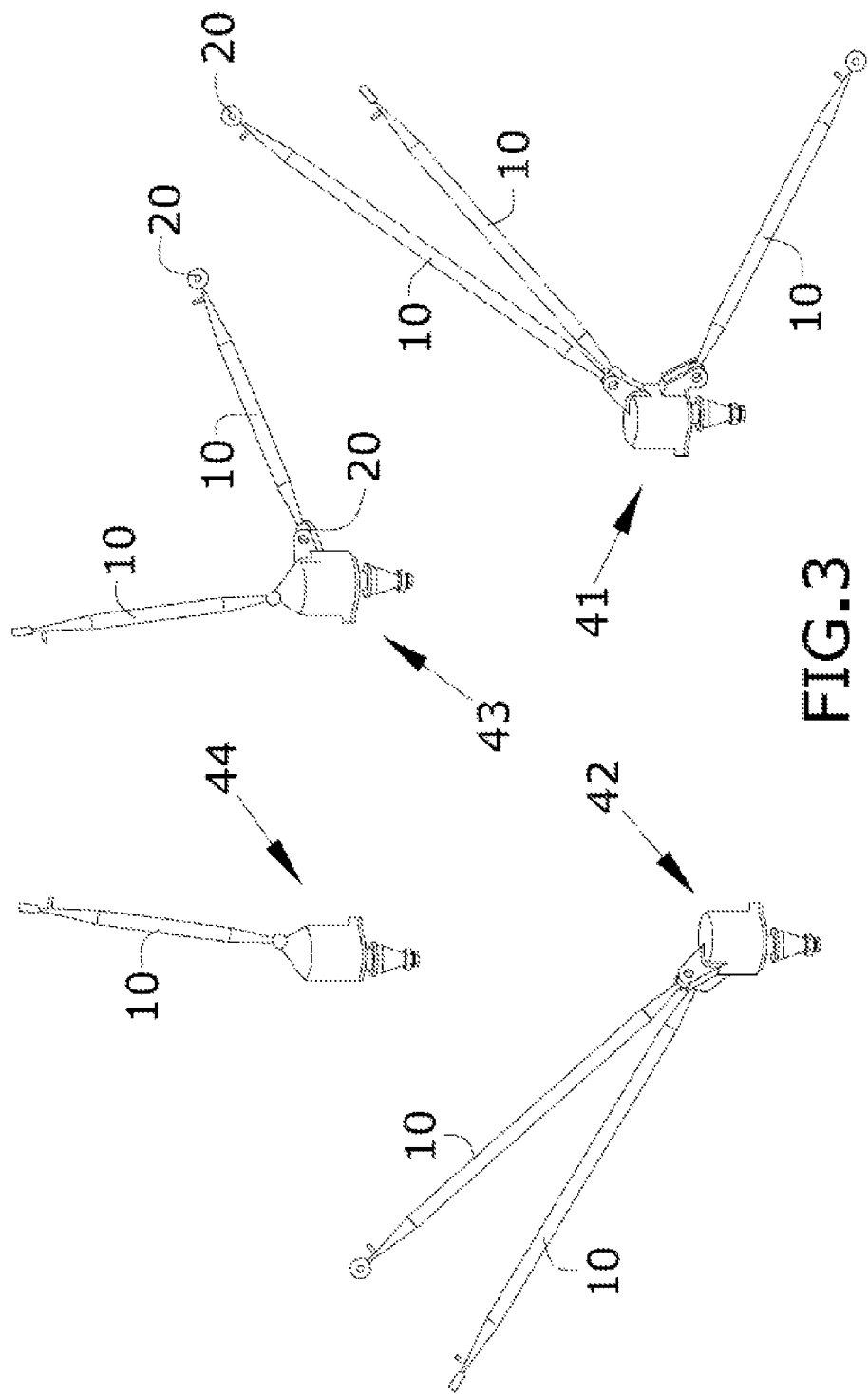

SUSPENSION SYSTEM FOR AN AIRCRAFT AUXILIARY POWER UNIT

RELATED APPLICATIONS

This application is the U.S. national phase of International Application No. PCT/ES2015/070927 filed Dec. 18, 2015, which designated the U.S. and claims priority to Spanish (EP) patent application 14382585.9 filed Dec. 30, 2014, the entire contents of each of which are hereby incorporated by reference.

FIELD OF THE INVENTION

The present invention refers to a suspension system for an aircraft Auxiliary Power Unit (APU), an engine or any heavy equipment significantly affecting the dynamic behaviour of the surrounding structure of the aircraft.

BACKGROUND OF THE INVENTION

The Auxiliary Power Unit (APU) provides auxiliary power (pneumatic and electric) to the various systems in an aircraft and Main Engine Start. It is conventionally suspended by several rigid linkages that attach the APU to the fuselage generally in the tailcone structure.

The APU suspension system ensures that all the rigid body degrees of freedom (DOF) of the system are removed whilst allowing relative motion to absorb the thermal expansion of the APU and manufacturing and assembly tolerances. Additionally, it has the purpose of isolating the aircraft from the machine vibrations and vice-versa, for instance, isolating the APU from aerodynamic and inertia dynamic loads coming from the aircraft by creating a spring damper system that avoids dynamic coupling between the APU and the aircraft and minimises load amplifications at critical frequencies.

Known suspension systems comprise seven struts or suspension rods for attaching the APU to the tailcone structure. They also comprise three vibration isolators (VIs) attached to the end of the struts adjacent to the engine or auxiliary power unit for reducing the transmission of vibration and shocks from the APU to the aircraft structure and vice-versa. The vibration isolators comprise a housing in connection with the struts for enclosing an elastomeric element for absorbing said vibrations.

Furthermore it comprises three APU attachment brackets for joining the Vibration Isolators (VIs) to the APU. The struts are joined to an extension of the housing. Each vibration isolator and its corresponding APU attachment bracket is called a mount.

Finally, seven structure attachment brackets are located at the end of the struts adjacent to the fuselage tailcone structure for joining the struts to said fuselage structure.

The struts have, in some cases, double pin rod-ends allowing the transmission of moments into the struts. The disavantage of said attachment configuration is not only that moments are carried by the struts but also that the dynamic behaviour predictability is poor, leading to a high number of unexpected failures.

The entire suspension system is designed to withstand all vibration, shocks, inertia loads within the defined operational limits. Known suspension systems are designed for being fail-safe with regards to strut failures and hence with respect to the failure of any one of the seven suspension rods or their respective attachment brackets with the fuselage structure or with the vibration isolator housing and in case of failure of one strut, the rest of the struts, APU attachment brackets, vibration isolators and structure attachment brackets are designed to withstand limit loads.

In addition each strut is also sized with safe-life criteria that is to say, they are designed to withstand the whole life of the aircraft. The metallic components of the three APU mounts and the corresponding APU attachment bracket are also designed safe-life.

All other APU system interfaces are flexible to permit translational movement and rotational displacement of the APU in all directions.

In case of fire in the APU compartment, the design of the vibration isolator's core member and housing does not allow separation of these parts even if the elastomer component forming the vibration isolator is damaged or destroyed. Although the function of the vibrator isolators will then be lost, the APU will settle only slightly.

The two main limitations of this design approach are, on one hand, that in case any mount fails, the system as a whole fails, or in other words, the system is not fail-safe with respect to mount failures, potentially leading to an inadvertent APU detachment. On the other hand, the system also has poor reliability with lower than expected Mean Time Between Unscheduled Removals (MTBURs) owing to a high sensitivity to changes in the dynamic behaviour, related to the coupling with the tailcone or local resonances, and internal loads distribution. Moreover, none of the mounts or vibration isolators have fail-safe devices such that they would accommodate a failure of any of their sub-components.

SUMMARY OF THE INVENTION

The suspension system for an auxiliary power unit of an aircraft located in a fuselage structure object of the invention comprises:
A plurality of struts extending between the auxiliary power unit and the fuselage structure,
A plurality of auxiliary power unit attachment brackets for connecting the struts to the auxiliary power unit,
A plurality of vibration isolators for joining the struts to the auxiliary power unit attachment brackets, the vibration isolators comprising a housing in connection with the struts for enclosing an elastomeric element in the loadpath for damping vibrations.

The suspension system is characterised in that at least one of the vibration isolators, usually called the main vibration isolator, comprises the following parts:
a cone-bolt in connection with the housing at one end and attached to the auxiliary power unit attachment brackets at the other end and having a longitudinal threaded hollow, being said longitudinal hollow open at the end of the auxiliary power unit attachment bracket,
an inner bolt partially located within the hollow of the cone-bolt and threaded to the upper part of the cone-bolt,
an outer bolt having a longitudinal through-hole and partially located within the hollow of the cone-bolt and comprising an external thread that engages the thread of the cone-bolt, the inner bolt extending across the hollow of said outer bolt and configured so that the outer bolt is male with respect to the to the cone-bolt and female with respect to the inner bolt.

Therefore the claimed system comprises two bolts acting as males and two bolts acting as females based on a bolt inside-bolt concept as the outer bolt acts as male and female and both bolts, outer and inner, fasten the cone-bolt to the APU bracket. In other words the claimed system comprises:

A cone-bolt which is male with respect to the APU attachment bracket and female with respect to the outer and inner bolts.

An outer bolt which is male with respect to the cone-bolt and female with respect to the inner bolt and it is threaded to the bottom part of the cone-bolt.

An inner bolt which is male with respect to both outer bolt and cone-bolt and it is threaded to the upper part of the cone-bolt, more specifically to the part of the cone-bolt which is in connection with the housing of the vibration isolator.

The characteristics described above make the main vibration isolator inherently fail-safe.

The claimed configuration has the advantage over the known configurations of the prior art, commonly having a bolt and a nut, that in case the cone-bolt breaks the inner bolt located inside it will bridge the discontinuity and still support the mount. Moreover, in case the outer bolt, which is threaded to the cone-bolt, joining it to the bracket and therefore acting as female, fails the inner bolt which is also threaded to the upper part of the cone-bolt could act as the joining element and support the mount.

Hence, the claimed invention makes the APU system a fully fail-safe system with regards to a vibration isolator failure with minimal weight increase.

Additionally, in order to be fully fail-safe regarding the main vibration isolator mount, ie, the vibration isolator and the APU attachment bracket, said bracket is divided into at least two parts. Each one of these parts is sized so that either can take limit loads in case any one of the other parts fails.

Optionally, the system comprises four mounts, the fourth mount fixing the auxiliary power unit in Z, therefore the system would be also fully safe for a strut failure.

Moreover, the system could be comprised of four mounts where at least one of them, the main mount, is connected to three struts and inherently fail-safe. This configuration would be fail-safe in as much as the main mount is inherently fail-safe and the other mounts can fail without the loss of function of the system as a whole, i.e., all of the rigid body degrees of freedom (DoFs) of the APU are still restricted.

Another possible configuration would be having only three mounts, all of them with the architecture described above for the main vibration isolator, inherently fail safe. The struts would be distributed.

DESCRIPTION OF THE FIGURES

To complete the description and in order to provide a better understanding of the invention, a set of drawings is provided. Said drawings form an integral part of the description and illustrate preferred embodiments of the invention. The drawings comprise the following figures.

FIG. 3 shows an embodiment of a configuration of the suspension system.

DETAILED DESCRIPTION OF THE INVENTION

Figure 1:
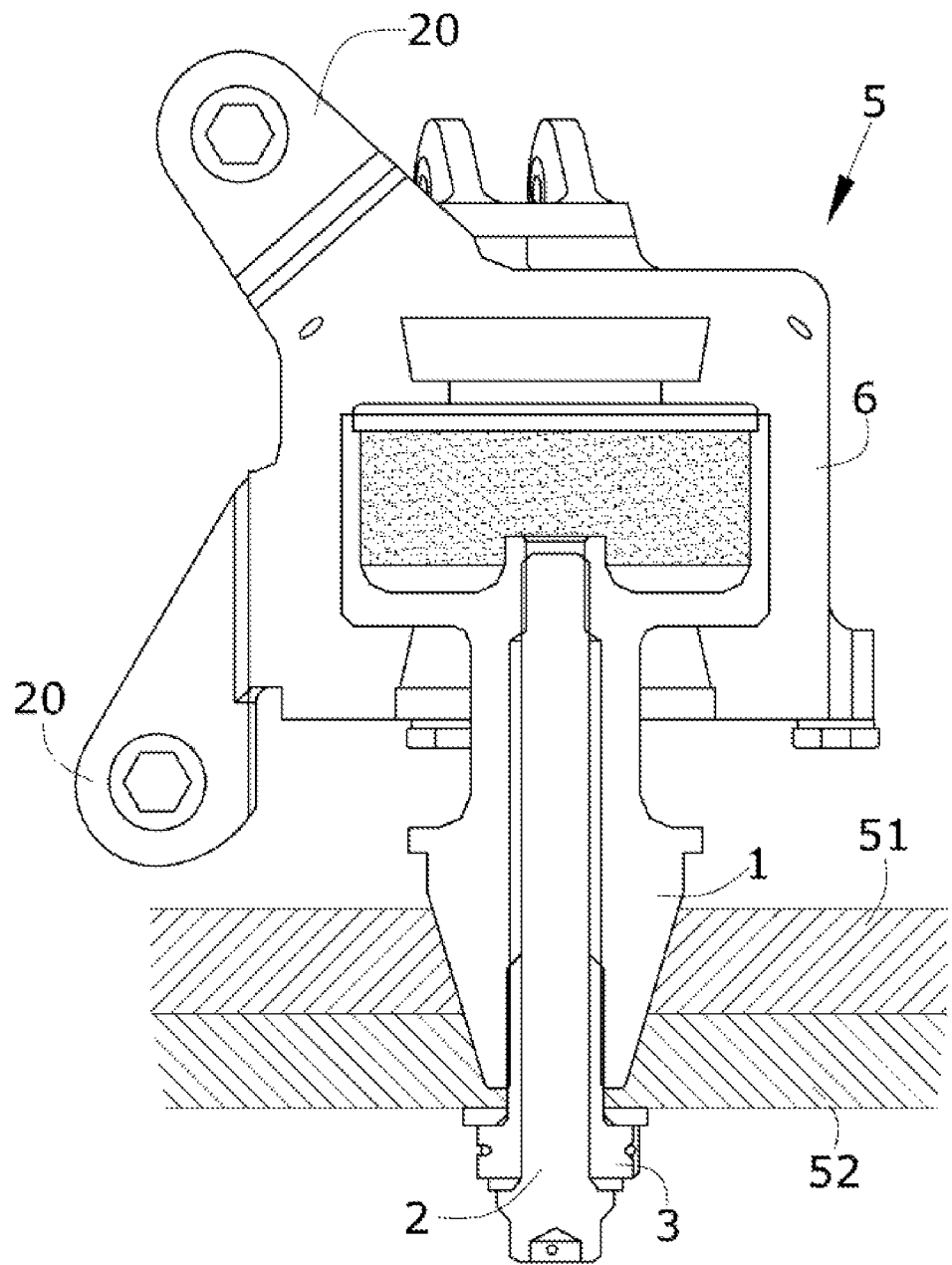
FIG. 1 shows a cross-section of the main vibration isolator according to a first embodiment of the invention.

In the embodiment shown in the figures the suspension system comprises four mounts (41, 42, 43, 44) being the main mount (41) connected to three struts (10), two mounts (42, 43) connected to two struts (10) and one mount (44) connected to one strut (10). The main mount (41) connected to the three struts (10) is the main attachment point of the engine as it is fixed in X, Y and Z, mounts two and three (42, 43) fixed the engine in XZ and YZ respectively and the fourth mount (44) fixes the engine in Z, the system is fully fail-safe under a strut (10) failure scenario.

Another object of the invention is therefore a system having four mounts (41, 42, 43, 44) the main mount (41) being connected to three struts (10), two mounts (42, 43) connected to two struts (10) and one mount (44) connected to one strut (10). Said configuration of the system can be applied to any kind of mount (41, 42, 43, 44) or vibration isolator (5) configuration, different from the previously described fail safe configuration and it has the advantage that the system is fully safe for the failure of any strut (10).

Having four mounts (41, 42, 43, 44) makes it possible to size the system so that it has enough Degrees of Freedom constraints and residual strength to withstand limit loads in case of a single failure of a strut (10) or mount (41, 42, 43, 44), except a failure of the main mount (41) which can be additionally dealt with by making said main mount (41) inherently fail-safe as described in the summary of the invention.

In the embodiment shown in the figures, the main mount (41) comprises a cone-bolt (1) which is a bolt having a conic shape, an outer bolt (3) and an inner bolt (2) that are also bolts located inside the cone-bolt (1). The outer bolt (3) being threaded to the bottom part of the cone-bolt (1) and the inner bolt (2) extends across the bottom part of the cone-bolt (1) and the outer bolt (3) and is threaded to the upper part of the cone-bolt (1) which lies inside the housing (6), and solidary to it through the elastomer that fills the space between the housing and the cone bolt.

The main mount comprises:

The cone-bolt (1) in connection with the vibration isolator housing (6), which, in turn is connected to the struts (10), at one end and attached to the APU attachment brackets (51, 52) at the other end. The cone-bolt (1) is hollow having a longitudinal threaded hole open all the way up to the top portion of its body, without actually being a through hole. The top portion is female-threaded so as to engage the inner bolt (2).

The outer bolt (3) has a longitudinal through-hole (non-threaded) and an external thread that engages the internal cone-bolt (1) thread such that it is the male part with respect to the cone-bolt (1), but female with respect to the inner bolt (2).

The inner bolt (2) which goes through the hollow of the outer bolt (3) all the way to the upper portion of the cone-bolt (1) where it engages the female thread on the top portion of the cone-bolt (1).

Figure 2:
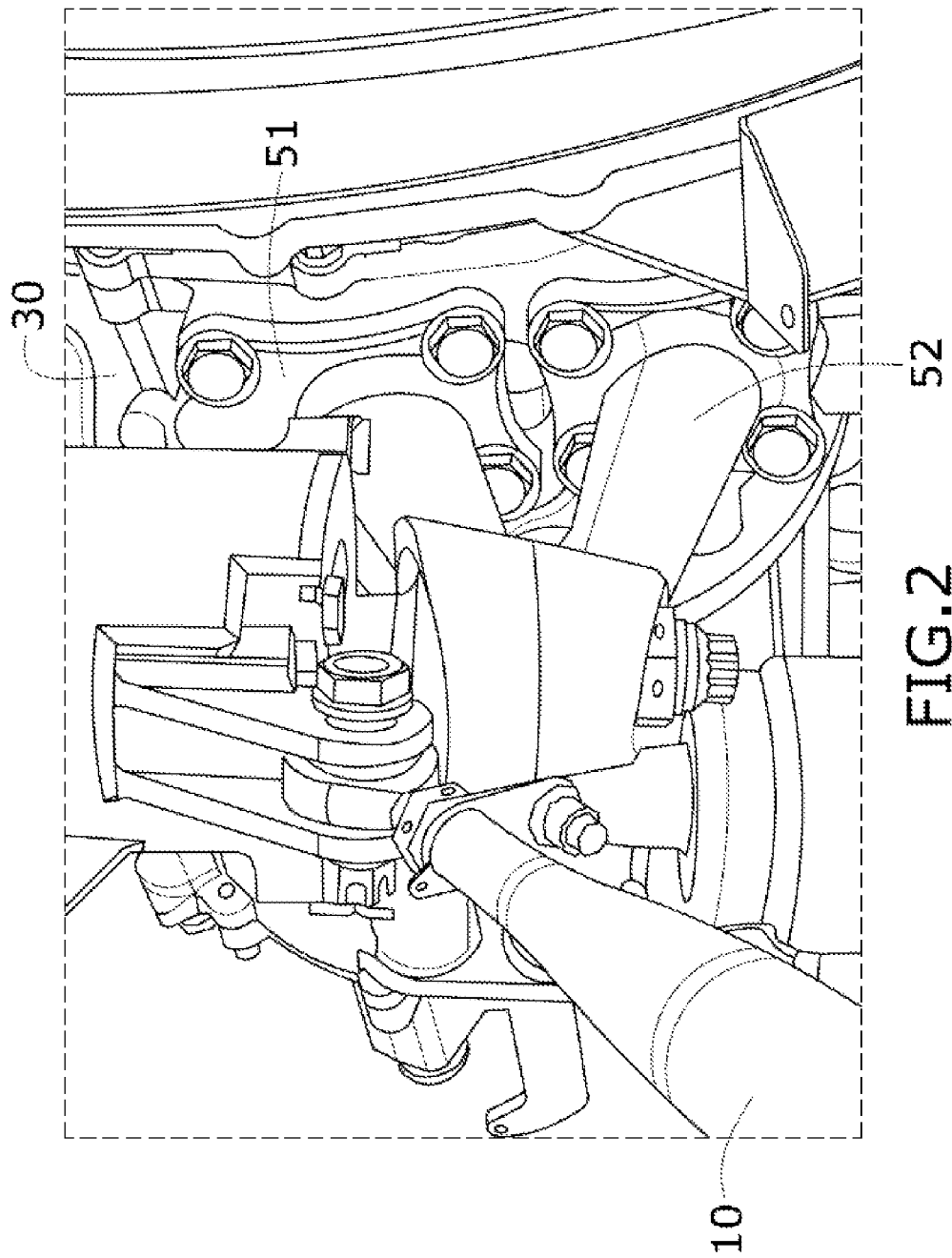
FIG. 2 shows a perspective view of a main mount comprising the main Vibration Isolator joined to three struts and to an engine.

Additionally, as shown in FIG. 2, the APU attachment bracket (51, 52) of said main mount (41) is divided into at least two parts, a first part (51) wrapping a first longitudinal portion of the cone-bolt (1) and connected to the auxiliary power unit (30) and a second part (52) wrapping a second longitudinal portion of the cone-bolt (1) and connected to the auxiliary power unit (30). It has the advantage that in case one of the two parts (51, 52) breaks the other part will still support the main mount (41) up to limit loads and the system is also additionally fail-safe regarding the APU attachment brackets (51, 52).

Furthermore, the elastomeric element filles the void between the part of the cone-bolt (1) in connection with the housing (6) and the housing (6) itself.

Since the system may forego any of the interfacing points except the main mount (41), and the main vibration isolator is inherently fail-safe, the APU suspension system of the embodiment shown in the figures is a fully fail-safe system with regards to both a strut (10) or mount failure.

Additionally to the inclusion of eight struts (10) instead of seven struts (10) and their corresponding four mounts (4), the struts (10) are also articulated at both ends, having a single point joint (20) at both ends of the strut (10) therefore avoiding the introduction of moments both in the engine (30) and in the fuselage structure.

Although the embodiment shown in the figures comprises a configuration having eight struts (10) articulated at both ends and also a fail-safe vibration isolator (5) having three bolts and a fail-safe APU attachment bracket (51, 52), the mentioned configuration having eight struts (10) articulated at both ends can be applied to any kind of mount (4), therefore it can also be applied to a one piece APU attachment bracket and to a bolt and nut vibration isolator (5) or main mount (4).

As it only contains ball-joint, single bolt rod-ends at both ends of the struts (10) and all doublebolt rod-ends disclosed in the prior art are eliminated, it renders the load at each strut (10) more predictable under all static and dynamic loading conditions as it is cumbersome to predict the moments transmitted by the double-eye rod-ends and their dynamic effects, therefore the number of failures is reduced. Moreover, having single point joints instead of double point joints is best practice for the design of slender members, intrinsically enhancing their reliability.

In order to install the whole suspension system the strut (10) attached to the mount (44) having only one strut (10) is adjustable in length. Firstly the main mount (41) and the mounts (42, 43) attached to two struts (10) are installed. Said three mounts (41, 42, 43) define a plane and afterwards the fourth mount (44) is installed. The strut (10) of the fourth mount (44) comprises a right hand thread on one end and a left hand thread on other end that allows said adjustment in length of the strut (10) so that it perfectly fits the APU position as defined by the previous three mounts (41, 42, 43) without introducing pre-loads to the system. Although with three mounts (41, 42, 43) the engine is fixed in space, the additional strut (10) renders the system fully fail-safe, as previously explained.

The invention claimed is:

1. A suspension system for an aircraft auxiliary power unit located in a fuselage structure, the system comprising:
    a plurality of struts extending between the auxiliary power unit and the fuselage structure,
    a plurality of auxiliary power unit attachment brackets for connecting the struts to the auxiliary power unit,
    a plurality of vibration isolators for joining the struts and the auxiliary power unit attachment bracket, the vibration isolators each comprising a housing connected with at least one of the struts and enclosing an elastomeric element in a load path extending through the vibration isolator and for damping vibrations,
    wherein at least one of the vibration isolators comprises:
    a cone-bolt connected at one end to the housing and, at another end, attached to the auxiliary power unit attachment brackets, wherein the cone bolt includes a longitudinal threaded hollow, wherein said longitudinal hollow is open proximate the auxiliary power unit attachment brackets,
    an inner bolt partially located within the hollow of the cone-bolt and threaded to the upper part of the cone-bolt,
    an outer bolt having a longitudinal through-hole and partially located within the hollow of the cone-bolt and comprising an external thread that engages the thread of the cone-bolt, the inner bolt extending across the hollow of said outer bolt and configured so that the outer bolt is male with respect to the to the cone-bolt and female with respect to the inner bolt.

2. The suspension system according to claim 1 wherein at least one of the auxiliary power unit attachment brackets is divided into at least two parts, a first part wrapping at least a first longitudinal portion of the cone-bolt and connected to the auxiliary power unit and a second part wrapping at least a second longitudinal portion of the cone-bolt and connected to the auxiliary power unit.

3. The suspension system according to claim 1 wherein the elastomeric element fills a void between the housing and a part of the cone-bolt in connection with the housing.

4. The suspension system according to claim 1 further comprising four mounts, each of the four mounts comprising a vibration isolator and an auxiliary power unit attachment bracket.

5. The suspension system according to claim 4 wherein one of the four mounts is connected to three of the struts, two of the four mounts are connected to two of the struts, and one of the four mounts is connected to one of the struts.

6. The suspension system according to claim 5 wherein the strut of the mount is connected to one strut is adjustable in length.

7. The suspension system according to claim 1 wherein the struts are each articulated at both ends of the strut.

8. A suspension system configured to support an auxiliary power unit in a fuselage of an aircraft, the system comprising:
    a strut having a first end section configured to connect to the fuselage and a second end section opposite to the first end section;
    an auxiliary power unit attachment bracket configured to support the auxiliary power unit within the aircraft;
    a vibration isolator configured to connect to the second end section of the strut and to the auxiliary power unit attachment bracket, wherein the vibration isolator includes:
    a housing having an internal chamber and an opening in the housing extending to the internal chamber;
    a joint extending from the housing and configured to connect to the second end section of the strut;
    an elastomeric element in the chamber;
    a cone bolt having a first end section and a second end section opposite to the first end section, wherein the first end section is seated in the chamber of the housing and abuts the elastomeric element, and the cone bolt extends through the opening in the housing and to the auxiliary power unit attachment bracket;
    the second end section of the cone bolt having an outer surface configured to be seated in an opening of the auxiliary power unit attachment bracket;
    an internal passage extending through the cone bolt from the second end section of the cone bolt and towards the first end section of the cone bolt;
    an inner bolt having a bolt head and a shaft, wherein the bolt head is configured to be adjacent a side of the auxiliary power unit attachment bracket opposite to the housing and the shaft extends through the auxiliary power unit attachment bracket and through at least a portion of the internal passage of the cone bolt and an end of the shaft engages the first end section of the cone bolt; and a hollow outer bolt positioned between the inner bolt and the cone bolt such that the inner bolt extends through the hollow outer bolt, wherein the hollow outer bolt has a head between the head of the inner bolt and the side of the auxiliary power unit attachment bracket.

9. The suspension system of claim 8 wherein the hollow outer bolt includes internal threads which engage external threads of the inner bolt and the hollow outer bolt includes external treads which engage internal threads in the second end section of the cone bolt.

10. The suspension system of claim 8 wherein the auxiliary power unit attachment bracket is a first bracket and another auxiliary power unit is a second bracket, wherein each of the brackets includes an opening receiving the cone bolt, and the first bracket has a side facing the housing and the second bracket has a side facing the head on the hollow outer bolt and the head on the inner bolt.

11. The suspension system of claim 10 wherein the first and second brackets each includes a collar around the cone bolt and an arm extending from the collar to the auxiliary power unit, wherein the collar defines the opening in the auxiliary power unit attachment bracket.

12. The suspension system of claim 8 wherein the cone bolt, inner bolt and outer bolt are aligned along a common axis.

13. The suspension system of claim 8 wherein the first end section of the cone bolt includes a cup and the elastomeric element is seated in the cup such that the cup and the elastomeric element substantially fill the chamber.

14. A mount comprising:
   an auxiliary power unit attachment bracket configured to connect to and support an auxiliary power unit within a fuselage of an aircraft;
   a vibration isolator configured to connect to the auxiliary power unit attachment bracket and connect to a strut which extends between the vibration isolator to the fuselage;
   wherein the vibration isolator includes:
      a housing having an internal chamber and an opening in the housing extending to the internal chamber;
      a joint extending from an outer surface of the housing and configured to connect to the strut;
      an elastomeric element in the chamber;
      a cone bolt having a first end section and a second end section opposite to the first end section, wherein the first end section is seated in the chamber of the housing and abuts the elastomeric element, and the cone bolt extends through the opening in the housing and to the auxiliary power unit attachment bracket;
      the second end section of the cone bolt having an outer surface configured to be seated in an opening of the auxiliary power unit attachment bracket;
      an internal passage extending through cone bolt from the second end section of the cone bolt and towards the first end section of the cone bolt;
      an inner bolt having a bolt head and a shaft, wherein the head is configured to be adjacent a side of the auxiliary power unit attachment bracket opposite to the housing, wherein the shaft extends through the auxiliary power unit attachment bracket and through at least a portion of the internal passage of the cone bolt and an end of the shaft engages the first end section of the cone bolt; and
      a hollow outer bolt positioned between the inner bolt and the cone bolt wherein the inner bolt extends through the hollow outer bolt, wherein the hollow outer bolt has a head between the head of the inner bolt and the side of the auxiliary power unit attachment bracket.

15. The mount of claim 14 wherein the hollow outer bolt includes internal threads which engage external threads of the inner bolt and the hollow outer bolt includes external treads which engage internal threads in the second end section of the cone bolt.

16. The mount of claim 14 wherein the cone bolt, inner bolt and outer bolt are aligned along a common axis.

17. The mount of claim 14 wherein the first end section of the cone bolt includes a cup and the elastomeric element is seated in the cup such that the cup and the elastomeric element substantially fill the chamber.

* * * * *